Nov. 26, 1968        E. C. JOHNS         3,413,020
COMPOSITE TUBE FITTING
Filed June 24, 1966
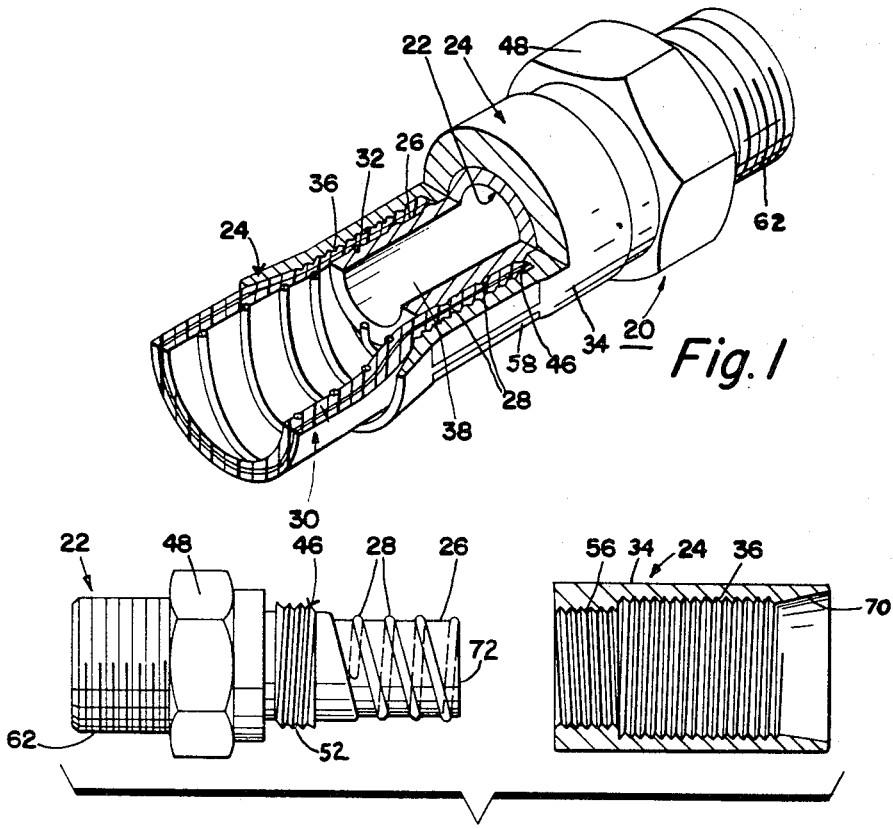
Fig. 1
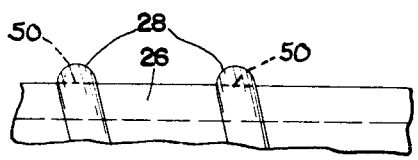
Fig. 2
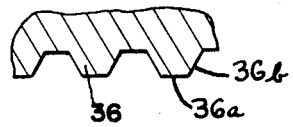
Fig. 3
Fig. 4
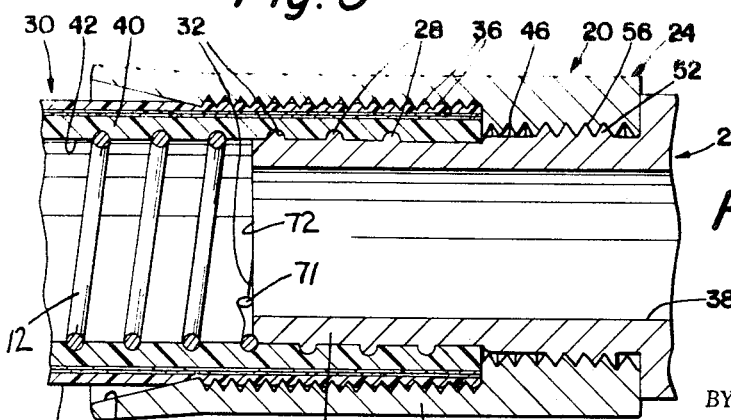
Fig. 5
INVENTOR.
EDWARD C. JOHNS
BY
Jeare, Jeare & Sammon
ATTORNEYS

# United States Patent Office 3,413,020
Patented Nov. 26, 1968

3,413,020
COMPOSITE TUBE FITTING
Edward C. Johns, Streetsboro, Ohio, assignor to Samuel Moore and Company, Mantua, Ohio, a corporation of Ohio
Filed June 24, 1966, Ser. No. 560,219
21 Claims. (Cl. 285—251)

ABSTRACT OF THE DISCLOSURE

A fitting assembly for fluid pressure transmission including a fitting member having an inner sleeve and an outer sleeve disposed in spaced relation around and threadably connected adjacent one end to the inner sleeve. A reinforced, crush-resistant composite tubing member is adapted to be disposed in the space between the inner and outer sleeves. The inner sleeve includes external threads for threaded engagement with the tubing member, and the outer sleeve includes internal teeth adapted for pressure engagement with the tubing member upon deformable movement thereof toward the inner sleeve.

Background of the invention

The present case relates to a pipe fitting and more particularly to a pipe fitting for coupling composite tubing in high pressure applications.

Tube fittings for use in high pressure operations such as undersea work, deep drilling, and direct burial under a road, are subjected to tremendous internal and external pressures ranging as high as 1000 p.s.i. Under such pressures, any defect in the seal between the pipe and the fitting will result in leakage and/or bursting. In deep sea operations, in particular, the need to avoid seepage of water into such vital areas as an air hose for diving bells or personal diving gear is of the utmost importance.

Accordingly, an object of this invention is to provide a fitting which may be used in deep sea operations, or other areas where the fitting is subjected to substantial internal and external pressures.

A further object is to provide a fitting to prevent leakage at the fittings in high pressure operations when used with an improved crush-resistant hose as set forth in the co-pending application Ser. No. 560,328 and comprising a composite tubing, having a polymeric inner core and a spiral helically disposed reinforcement means partially embedded in the internal surface of the core.

Summary of the invention

The present invention contemplates providing a fitting member for use with a crush-resistant tubing member which will be subjected to high internal and external pressures, such as encountered in deep sea diving operations or the like, comprising a fitting member including a hollow inner sleeve having external thread means thereon and an outer sleeve member spaced from the inner sleeve member. The inner sleeve member includes a raised cylindrical spacing portion having external threads thereon. The outer sleeve is provided with internal threads arranged for threaded engagement with the threads on said spacing portion. A composite tubing member is disposed between the inner and outer sleeves and includes a polymeric inner core having channel means disposed on the inner surface thereof adapted for mating engagement with the external thread means on the inner sleeve. The outer sleeve member includes internal teeth means thereon and is adapted for pressurized engagement with the external periphery of the tubing member upon deformable movement of the outer sleeve toward the inner sleeve. The tubing member includes a partially embedded reinforcing means adjacent the interior surface and includes abutment means disposed adjacent the end thereof to engage the terminal end of the inner sleeve upon threading of the tubing member onto the inner sleeve.

By this arrangement, a fitting is provided which can be used with a crush-resistant tubing member, and which prevents leakage between the tubing member and the fitting member when subjected to extremely high internal and/or external pressures.

Referring now to the drawings:

FIG. 1 is a perspective view, partly in section, of a fitting according to the present invention and having a composite tubing assembled therewith;

FIG. 2 is an exploded view partly in plan and partly in section showing the two mating portions of the fitting;

FIG. 3 is an enlarged fragmentary view of the external helical threads on the inner fitting sleeve;

FIG. 4 is an enlarged cross-sectional fragmentary view of the teeth of the outer crimpable sleeve;

FIG. 5 is a fragmentary sectional view of a composite tubing in assembled position about the inner sleeve of the fitting prior to crimping of the outer fitting sleeve.

Referring again to the drawings, FIG. 1 is a partially cut away assembly view illustrating a polymeric composite tubing 30 assembled in fitting 20. The tubing is disposed between an inner fitting sleeve 26 and a crimpable outer fitting sleeve 34. The tubing is secured in the fitting in a pressure tight relationship by being wedged between teeth means 36 on the outer sleeve and external thread means 28 on the inner sleeve 26 which coact with a helical cavity 32 in the inner surface 42 (FIG. 5) of the core 40. The wedging action occurs by the outer sleeve being crimped inwardly towards the inner sleeve. The teeth means 36 serves to prevent migration of fluid between the outer jacket 44 of the tubing and the outer sleeve. The thread means 28 in coaction with the displaced core material adjacent the cavity 32 act to prevent fluid ingress and/or egress between the core 40 of the composite tubing 30 and the inner sleeve 26 of the fitting. By the foregoing arrangement a coupling is produced which provides a system capable of withstanding high external and internal pressures without bursting or leaking.

Where the fitting 20 will be subjected to corrosive influences, such as in undersea operations, it is preferred to make it of stainless steel. For ease of manufacture it is preferred that the fitting 20 be of two piece construction, as shown in FIG. 2, and of a type of metal which permits machining to close tolerances.

As shown in FIGS. 1 and 2, the fitting may have an inner member 22 and an outer member 24. The inner member 22 may be of step-wise construction having the aforesaid cylindrical inner sleeve means 26 adjacent at least one end thereof, a raised cylindrical spacing portion 46 disposed axially inward from the inner sleeve means 26, and a shank portion 48 adapted for receiving a turning tool (not shown).

The inner member 22 includes a central aperture 38 projecting axially through the member and providing the passageway for fluid from the composite tubing 30 to another length of tubing, or to the destination apparatus of the fluid, such as the air inlet for a diving bell.

The inner sleeve means 26 includes a raised helical thread means 28 disposed adjacent the end thereof for receiving in threaded engagement a mating helical cavity 32 on the inner surface 42 of the tubing core 40. The pitch of the tubing core cavity 32 and of the thread means 26 are preferably of a predetermined value so that the two will correspond to to permit the tubing core to be threaded onto the projection. It is preferred that the clearance between the thread means 26 and the core cavity 32 be about 0.015 inch. It is further preferred that the thread means 28 be arcuate in transverse cross section and widely spaced apart, at least twice the width of the base 50 of the thread means. A preferred spacing is four times the base. A preferred range is between 2 to 5 times the base. A preferred pitch angle is 17°48′. The desired pitch angle range is between about 21°5′ and 8°45′.

The inner member 22 may have a cylindrical spacing portion 46 of wider diameter than the external diameter of the thread means 28 (FIG. 2). The spacing portion 46 may have conventional machine threads 52 thereon. The purpose of the machine threads 52 will be discussed hereinafter.

As shown in FIG. 2, the inner member 22 has an outer integral shank portion 48 having generally planar sides, such as hexagonal, which may coact with a suitable tool, such as a bar wrench (not shown) to cause rotation of the entire fitting to thread the core 40 of the composite tubing 30 onto the inner sleeve means 26.

The outer member 24 is preferably in the form of a hollow outer sleeve means 34 having an inner diameter which is greater than the outer diameter of the thread means 28. The outer sleeve means 34 may have adjacent one end internal threaded portions 56 corresponding to the external machine threads 52 of the spacing portion 46, whereby the outer sleeve means 34 may be threaded onto the spacing portion 46. By such arrangement, the outer sleeve circumscribes the inner sleeve in predetermined spaced relation from the thread means 28 of the inner sleeve.

The outer sleeve 34, is of sufficiently thin material to permit it to be crimped radially inwardly intermediate its end as at portions 58 such as by a convenient crimping tool (not shown). It is desired that the crimping be intermediate the ends in order to prevent shearing of the composite tubing and/or outer sleeve.

The outer sleeve may have internal teeth means 36 in the form of a helix which, upon crimping of the outer sleeve, tightly engage the relatively soft outer surface of the tubing 30 in a compressive action. The teeth means preferably have substantially planar crests 36a and inclined sides 36b. A preferred inclination range for the sides of the teeth means is between about 15° and 45°. A preferred angle of inclination is about 30°.

The spacing portion 46 of the inner sleeve 26 is preferably of a sufficient diameter so that the planar crest portions 36a of the teeth means 36 of the outer sleeve 34 are spaced from the thread means of the inner sleeve 26 by a sufficient distance to permit the composite tube 30 to be threaded onto the inner sleeve means 26. In order to accomplish the aforesaid threading, the outer diameter of the inner sleeve thread means 28 relative to the inner diameter of the outer sleeve teeth means 36 should differ by an amount which is either slightly greater than the thickness of the wall of the composite tubing 30, or only slightly less than such wall thickness so that the tubing may be readily inserted between the sleeve means. In order to facilitate the initial insertion, it is preferred that the outer sleeve 34 be radially outwardly flared as at 70, adjacent the tubing entry end.

The outer sleeve 34 projects axially beyond the inner sleeve 26. By such arrangement the tubing is prevented from crimping, and thus avoiding resultant damage or breaking of the tube at the point where wedging within the fitting begins.

It is preferred that the fitting be used in coaction with a composite tubing having a partially embedded reinforcing means 12 therein. In such tubing the mating helical cavity 32 is formed by removing the last few turns from the core such as by pulling the end of the reinforcing means 12 with pliers and then cutting the separated portions by a convenient means such as by a wire cutter. The reinforcing means 12 is embedded to a depth substantially corresponding to the height of the inner sleeve thread means 28.

The composite tubing 30 should be threaded onto the inner sleeve 26 until the tang 71 of the internal reinforcing means 12 is positioned adjacent the end 72 of the inner sleeve 26 thereby insuring that the tang is positioned well within the rearward overhanging portion of the outer sleeve 34, and axially inwardly from the flared portion 70, so that the tang 71 is positioned adjacent the area wherein the composite tubing is immobilized by the wedging action of the inner sleeve 26 and outer sleeve 34 of the fitting. Such positioning prevents the tang from cutting or puncturing the core 10 when the composite tubing 30 flexes during operation. It is preferred that the outer sleeve 34 project beyond the inner sleeve 26 by a distance at least about ⅓ of the length of the inner sleeve, or at least ½ inch.

The polymeric core should be crystalline for strength, but subject to some flow in order to achieve a tight engagement with the thread means 28 upon crimping of the outer sleeve.

Where the fitting is to be used to couple two composite tube lengths the far end of the inner member 22 may have an inner sleeve and outer sleeve arrangement (not shown) similar to the aforedescribed inner sleeve 24 and outer sleeve 34. Where the fitting is to be connected directly to an apparatus, such as a fluid reservoir (not shown) a conventional thread such as at 62 may be disposed at the far end of the inner member 22.

The novel fitting and tubing assembly of the instant invention provides a rapid and simple means for securing an internally reinforced composite tubing to a fitting. By such arrangement foreign fluids, such as sea water at deep sea pressures, are prevented from seeping between the tubing and fitting and into the interior of the core. Similarly, fluid inside the composite tubing, such as the high pressure helium-air mixture, is prevented from escaping at the fitting. Should any fluid escape into the fitting past the teeth means of the outer sleeve, the coaction between the core 40 of the tubing and the inner sleeve thread means 28 prevents ingress of the fluid into the fluid conveying passage of the core.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

I claim:

1. A fitting assembly for use in coupling a crush-resistant hose of the type which may be subjected to high internal and/or external pressures comprising, a hollow inner sleeve having external helical threads on the outside thereof and an outer sleeve member spaced from said inner sleeve and having a portion adapted for movement toward said inner sleeve, said inner sleeve including a raised, cylindrical spacing portion having external threads thereon, said outer sleeve having internal threads arranged for threaded engagement with the threads on said spacing portion, a composite tubing including a polymeric inner core having a helical channel disposed on the inner surface thereof, one end of said tubing being disposed between said inner sleeve and said outer sleeve, said inner sleeve having an external helical thread on the outside thereof being disposed in said channel, said outer sleeve having internal teeth thereon, said teeth being in pressure engagement with the external periphery of said tubing, and a reinforcing wire partially embedded in said channel having a tang in engagement with the end of said inner sleeve.

2. A fitting according to claim 1 wherein said helical thread is arcuate in cross-section.

3. A fitting according to claim 1, wherein adjacent base portions of said helical thread are separated axially of the inner sleeve by a distance at least twice the width of a base portion of the thread.

4. A fitting according to claim 1, wherein said teeth have substantially planar crests.

5. A fitting according to claim 1, wherein said outer sleeve extends axially beyond said inner sleeve.

6. A fitting according to claim 1, wherein said outer sleeve is internally flared radially outward adjacent its end.

7. A fitting according to claim 1, wherein said inner sleeve includes a raised polygonal portion having planar periphery portions adapted for engagement with a tool for rotation of said inner sleeve and said outer sleeve as a unit.

8. A fitting assembly according to claim 1, wherein said composite tubing includes an outer reinforcement layer disposed about said inner core, and an outer protective jacket disposed about said reinforcement layer.

9. A fitting assembly according to claim 1, wherein said reinforcing wire terminates inwardly from the end of said inner sleeve.

10. A fitting assembly according to claim 1, wherein said channels correspond to a removed portion of said reinforcing wire adjacent the end of said tubing.

11. A fitting assembly according to claim 10, wherein said channels are of a depth substantially corresponding to the height of said helical thread.

12. A fitting assembly according to claim 1, wherein the clearance between said helical thread and said channel is about 0.015 inch.

13. A fitting assembly according to claim 1, wherein the pitch angle range of said helical thread is in the range between about 8° to 21°.

14. A fitting assembly of the type which may be subjected to high internal and/or external pressures comprising, a fitting member including a hollow inner sleeve having external thread means thereon and an outer sleeve member spaced from said inner sleeve member and having a portion adapted for deformable movement inwardly toward said inner sleeve, said outer sleeve being threadably connected to said inner sleeve adjacent one end thereof, a composite tubing member including a polymeric inner core having a channel means disposed on the inner surface thereof, one end of said tubing being disposed between said inner sleeve and said outer sleeve, said inner sleeve having external thread means thereon adapted for engagement within said channel means, said outer sleeve portion having internal teeth means thereon for pressure engagement with the external periphery of said tubing member, reinforcing means partially embedded in said channel means, and said reinforcing means having abutment means disposed inwardly from the end of said tubing member for engagement with the adjacent end of said inner sleeve.

15. A fitting assembly according to claim 14, wherein said abutment means comprises a tang disposed adjacent the terminal end of said reinforcing means.

16. A fitting assembly according to claim 15, wherein said reinforcing means comprises a helical wire.

17. A fitting assembly according to claim 16, wherein said channel means comprises a generally helical-shaped channel which corresponds to a removed portion of said reinforcing wire adjacent the said end of said tubing member.

18. A fitting assembly according to claim 17, wherein said channel corresponds substantially in radial depth to the radial height of said helical wire.

19. A fitting assembly according to claim 17, wherein said channel is of generally uniform depth throughout its lenth.

20. A pipe fitting for high pressure reinforced tubing comprising, in combination, a hollow inner sleeve having external threads thereon, a hollow outer sleeve having internal threads thereon, said inner sleeve being threadably connected within said outer sleeve by threaded engagement of their respective external and internal threads so that one end of said outer sleeve extends axially outwardly beyond the corresponding end of said inner sleeve, the last mentioned end of said inner sleeve including a generally helical thread-like means disposed on the exterior thereof, a polymeric tubing disposed at one end between said inner and outer sleeves and having an inner surface defining an internal passageway for transmitting fluid therethrough, a generally helical reinforcing means partially embedded in said inner surface generally throughout its length and terminating interiorly of said outer sleeve in an abutment means for engagement with the adjacent end of said inner sleeve, said inner surface having a generally helical channel defined by a removed portion of said reinforcing means, and said helical thread-like means threadably disposed in said channel for securement of said tubing to said inner sleeve.

21. A pipe fitting in accordance with claim 20, wherein said tubing is of a uniform diameter throughout its length and has a generally smooth external surface, and wherein said reinforcing means includes a helical wire disposed to prevent collapsing of said tubing.

References Cited

UNITED STATES PATENTS

| | | | |
|---|---|---|---|
| 2,479,499 | 8/1949 | Le Clair | 285—256 |
| 3,245,699 | 4/1966 | Peterman | 285—256 X |

FOREIGN PATENTS

| | | |
|---|---|---|
| 73,538 | 7/1917 | Austria. |
| 1,224,248 | 2/1960 | France. |
| 702,913 | 2/1941 | Germany. |

CARL W. TOMLIN, *Primary Examiner.*

THOMAS F. CALLAGHAN, *Assistant Examiner.*